(12) United States Patent
Marvaniya et al.

(10) Patent No.: US 11,928,699 B2
(45) Date of Patent: Mar. 12, 2024

(54) AUTO-DISCOVERY OF REASONING KNOWLEDGE GRAPHS IN SUPPLY CHAINS

(71) Applicant: International Business Machines Corporation, Armonk, NY (US)

(72) Inventors: Smitkumar Narotambhai Marvaniya, Bangalore (IN); Ranjini Bangalore Guruprasad, Bangalore (IN); Shantanu R. Godbole, Bangalore (IN); Kedar Kulkarni, Bangalore (IN); Jitendra Singh, New Delhi (IN); Geeth Ranmal de Mel, Warrington (GB); Richard J. Tomsett, Southampton (GB); Komminist Weldemariam, Ottawa (CA)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/219,272

(22) Filed: Mar. 31, 2021

(65) Prior Publication Data
US 2022/0318831 A1 Oct. 6, 2022

(51) Int. Cl.
*G06Q 10/04* (2023.01)
*G06F 16/9032* (2019.01)
(Continued)

(52) U.S. Cl.
CPC ... *G06Q 30/0205* (2013.01); *G06F 16/90332* (2019.01); *G06F 16/9537* (2019.01);
(Continued)

(58) Field of Classification Search
CPC .............. G06Q 30/0205; G06Q 10/04; G06F 16/90332; G06F 16/9537; G06N 5/022;
(Continued)

(56) References Cited

U.S. PATENT DOCUMENTS 5,966,126 A * 10/1999 Szabo ................... G06F 16/338
707/E17.082
8,112,300 B2    2/2012 Harper
(Continued)

FOREIGN PATENT DOCUMENTS

WO    2020010350 A9    1/2021

OTHER PUBLICATIONS

Big data analytics and demand forecasting in supply chains: a conceptual analysis. Hofmann, Erik; Rutschmann Emanuel. International Journal of Logistics Management. 29.2: 739-766. Emerald Group Publishing Limited. (2018).*

(Continued)

*Primary Examiner* — Timothy Padot
(74) *Attorney, Agent, or Firm* — Ryan, Mason & Lewis, LLP (57) ABSTRACT

Methods, systems, and computer program products for auto-discovery of reasoning knowledge graphs in supply chains are provided herein. A computer-implemented method includes obtaining a spatiotemporal query related to a demand of at least one product in a supply chain; analyzing the spatiotemporal query to identify one or more parameters affecting the demand of the at least one product, wherein the one or more parameters comprise at least one of one or more climate parameters and one or more disruptive event parameters; generating a knowledge graph comprising information indicating an impact on the demand of the at least one product for at least a portion of the one or more parameters; and outputting, to a user interface, an explanation of a predicted demand forecast for the at least one product based at least in part on the knowledge graph.

20 Claims, 9 Drawing Sheets

(51) Int. Cl.
*G06F 16/9537* (2019.01)
*G06N 5/022* (2023.01)
*G06N 5/025* (2023.01)
*G06Q 30/0204* (2023.01)

(52) U.S. Cl.
CPC .............. *G06N 5/022* (2013.01); *G06N 5/025* (2013.01); *G06Q 10/04* (2013.01)

(58) Field of Classification Search
CPC ........ G06N 5/025; G06N 3/045; G06N 3/047; G06N 5/045; G06N 3/126; G06N 20/00
USPC ........................................................ 705/7.34
See application file for complete search history.

(56) References Cited

U.S. PATENT DOCUMENTS

| | | | |
|---|---|---|---|
| 9,172,738 B1* | 10/2015 | daCosta | G06Q 30/0601 |
| 9,430,549 B2 | 8/2016 | Guo et al. | |
| 10,366,346 B2 | 7/2019 | Achin et al. | |
| 10,380,263 B2 | 8/2019 | Martinez Corria et al. | |
| 10,528,877 B1 | 1/2020 | Hazard et al. | |
| 10,621,166 B2 | 4/2020 | Mittal et al. | |
| 2006/0085408 A1* | 4/2006 | Morsa | G06Q 30/0275 |
| 2009/0150208 A1* | 6/2009 | Rhodes | G06Q 10/087 |
| | | | 705/28 |
| 2011/0004510 A1 | 1/2011 | Bateni et al. | |
| 2014/0058794 A1* | 2/2014 | Malov | G06Q 10/087 |
| | | | 705/7.31 |
| 2015/0120369 A1* | 4/2015 | Agrawal | G06Q 10/06315 |
| | | | 705/7.25 |
| 2016/0217480 A1 | 7/2016 | Walker et al. | |
| 2016/0300174 A1 | 10/2016 | Grichnik | |
| 2016/0328670 A1* | 11/2016 | Adam | G06Q 10/06315 |
| 2017/0039500 A1* | 2/2017 | Leidner | G06Q 10/0833 |
| 2017/0236079 A1* | 8/2017 | Venna | G06F 16/2428 |
| | | | 705/4 |
| 2017/0262764 A1 | 9/2017 | Karuppasamy | |
| 2018/0046964 A1 | 2/2018 | Leoni et al. | |
| 2018/0060793 A1 | 3/2018 | Sama et al. | |
| 2019/0163818 A1 | 5/2019 | Mittal et al. | |
| 2019/0303498 A1* | 10/2019 | Saha | G06F 16/367 |
| 2020/0007398 A1 | 1/2020 | Gaikwad et al. | |
| 2020/0042643 A1* | 2/2020 | Carrier | G06N 5/01 |
| 2020/0134545 A1 | 4/2020 | Appel et al. | |

OTHER PUBLICATIONS

Xiaojun Chen, Shengbin Jia, Yang Xiang, A review: Knowledge reasoning over knowledge graph, Expert Systems with Applications, vol. 141. Mar. 2020.*

C. Lv, Y. Lu, X. Yan, W. Lu and H. Tan, "Supplier recommendation based on knowledge graph embedding," 2020 Management Science Informatization and Economic Innovation Development Conference (MSIEID), Guangzhou, China, 2020, pp. 514-518.*

Generating counterfactual explanations with natural language [arXiv]. Hendricks, Lisa Anne; Ronghang Hu; Darrell, Trevor; Akata, Zeynep. arXiv: 4 . arXiv. (Jun. 26, 2018).*

Mell, Peter, et al., The NIST Definition of Cloud Computing, National Institute of Standards and Technology, U.S. Department of Commerce, NIST Special Publication 800-145, Sep. 2011.

Kinaxis, What-If Analysis (Scenario Simulations), available at: https://www.youtube.com/watch?v=F3dZ7JIUDx0&ab_channel= Kinaxis, Sep. 1, 2015, (last accessed Mar. 31, 2021).

Selvaraju, Ramprasaath R., et al. "Grad-cam: Visual explanations from deep networks via gradient-based localization." Proceedings of the IEEE international conference on computer vision. 2017.

Gurumoorthy, Karthik S., et al. "Efficient data representation by selecting prototypes with importance weights." IEEE International Conference on Data Mining (ICDM). IEEE, Nov. 2019.

Arya, Vijay, et al. "One explanation does not fit all: A toolkit and taxonomy of ai explainability techniques." arXiv preprint arXiv:1909.03012, Sep. 2019.

Hind, Michael, et al. "TED: Teaching AI to explain its decisions." Proceedings of the 2019 AAAI/ACM Conference on AI, Ethics, and Society, Jan. 2019.

Ribeiro, Marco Tulio, Sameer Singh, and Carlos Guestrin. ""Why should i trust you?" Explaining the predictions of any classifier." Proceedings of the 22nd ACM SIGKDD international conference on knowledge discovery and data mining. Aug. 2016.

Lundberg, Scott, and Su-In Lee. "A unified approach to interpreting model predictions." arXiv preprint arXiv:1705.07874 May 2017.

Benefits of Natural Language Processing for the Supply Chain, https://www.blumeglobal.com/learning/natural-language-processing/, Blume Global, accessed Feb. 3, 2021.

* cited by examiner

AUTO-DISCOVERY OF REASONING KNOWLEDGE GRAPHS IN SUPPLY CHAINS

BACKGROUND

The present application generally relates to information technology and, more particularly, to artificial intelligence (AI) techniques.

Disruptive events, such as climate-related hazards, have tested the resiliency of supply chains, including food and manufacturing supply chains, for example. Industries lack the tools necessary to identify and understand the level of risk at the various stages of such supply chains.

SUMMARY

In one embodiment of the present disclosure, techniques for auto-discovery of reasoning knowledge graphs (KGs) in supply chains are provided. An exemplary computer-implemented method can include obtaining a spatiotemporal query related to a demand of at least one product in a supply chain; analyzing the spatiotemporal query to identify one or more parameters affecting the demand of the at least one product, wherein the one or more parameters comprise at least one of one or more climate parameters and one or more disruptive event parameters; generating a knowledge graph comprising information indicating an impact on the demand of the at least one product for at least a portion of the one or more parameters; and outputting, to a user interface, an explanation of a predicted demand forecast for the at least one product based at least in part on the knowledge graph.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

DETAILED DESCRIPTION

Existing techniques related to supply chain optimization generally forecast demand based on short-term weather predictions. For example, techniques in operations research (OR) focus on optimizing every stage of a supply chain based on mathematical equations that model the flow of goods in the supply chain. The set of mathematical equations are typically closed form and based on "first-principles" (e.g., balance equations) that represent clear input-output relationships between different nodes of the supply chain. However, such techniques do not account for mid-term and long-term disruptions in a supply chain due to factors related to climate changes, floods, cold waves, and heatwaves, for example, and fail to provide meaningful insights into how demand is forecasted to help subject matter experts (SMEs) take proactive actions for risk optimization.

As described herein, an embodiment of the present disclosure includes techniques for auto-discovery of reasoning KGs in supply chains. One or more example embodiments allow a user to specify natural language queries to determine risks in the supply chains. At least one embodiment includes automatically triggering a short conversation to identify a human-computer conversation to identify, for example, the relevant domain ontology, entities, and stages in the supply chains. Further, a reasoning KG may be automatically discovered by interpreting one or more spatiotemporal queries of a user, which may be implemented as part of an explainability framework that provides and outputs explanations of demand forecast predictions. Such explanations are useful for understanding the mid-term risks and/or long-term risks at various stages in the supply chain, as described in more detail herein.

Figure 1:
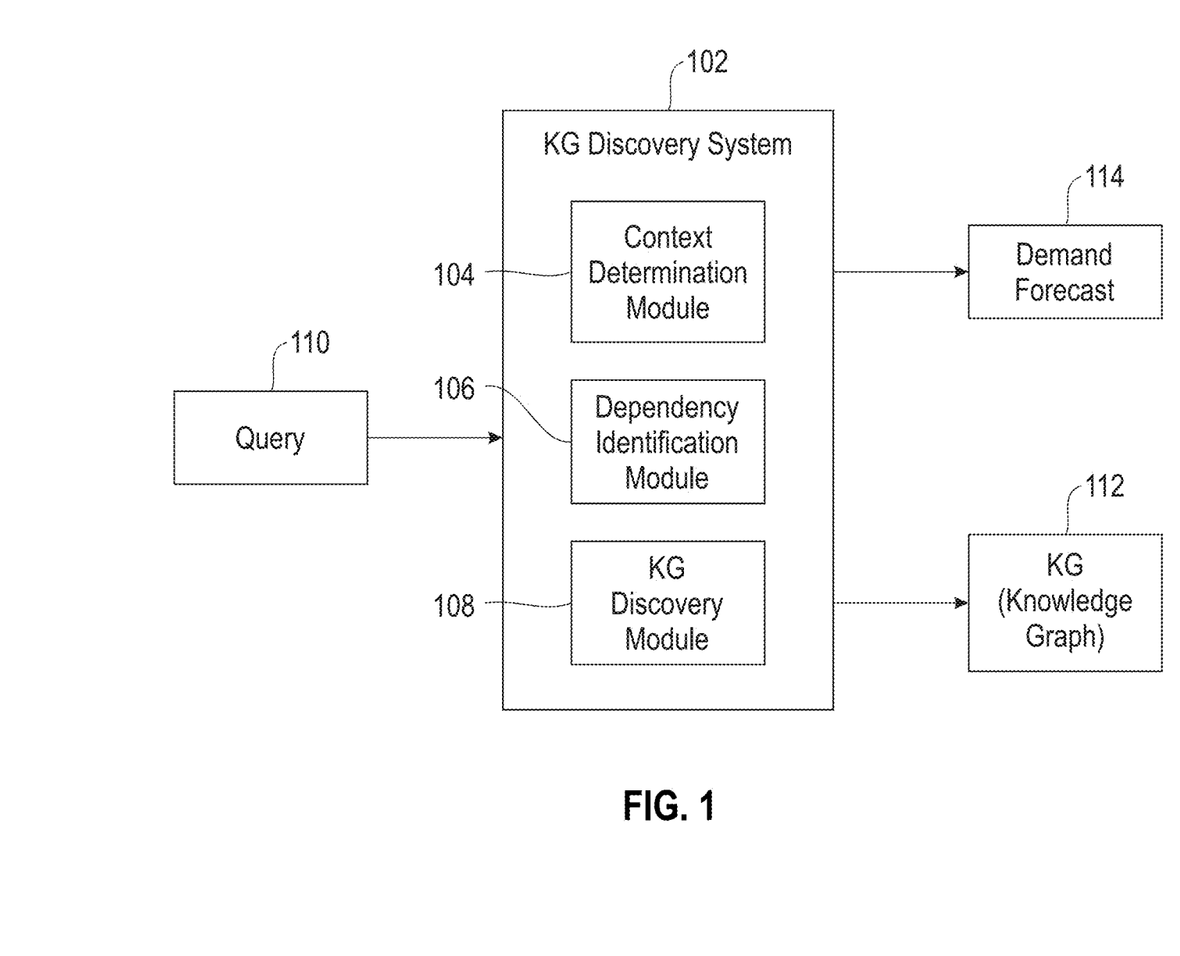
FIG. 1 is a diagram illustrating a system architecture, according to an exemplary embodiment of the present disclosure.

FIG. 1 is a diagram illustrating a system architecture, according to an embodiment of the present disclosure. By way of illustration, FIG. 1 depicts a KG discovery system 102 that includes a context determination module 104, a dependency identification module 106, and a KG discovery module 108. The KG discovery system 102 obtains a query 110, which is analyzed by the context determination module 104 to identify a relevant context. By way of example, the context determination module 104 may identify one or more particular stages of a supply chain, as well as entities and subsets of domain ontologies relevant to the particular stages of the supply chain by implementing natural language parsing and intent classification techniques, as described in more detail elsewhere herein.

The dependency identification module 106 identifies relevant dependencies to capture climatic variations along with disruptive events. The dependency identification module 106 may obtain the domain ontologies and entities identified by the context determination module 104 as input, and then determine various other inputs based on at least one of a regional climate model, a disruptive event impact model, and individual stage-specific characteristics in the supply chain, for example. The additional dependencies identified by the dependency identification module 106 may pertain to, for example, predicted climatic variations and/or disruptive events that are relevant to the determined context.

The KG discovery module 108 implements a reasoning layer to automatically discover a KG 112. The KG 112 may be output by the KG discovery module 102 along with a demand forecast 114. In at least one embodiment, the KG discovery module 108 obtains the additional dependencies, at least one of the regional climate model, the disruptive event impact model, and the individual stage-specific characteristics in the supply chain utilized by the dependency identification module 106. The KG discovery module 108 then automatically discovers a set of what-if queries to analyze the impact of different scenarios (e.g., different climatic conditions) on a demand forecast prediction model, as explained in more detail elsewhere herein.

Figure 2:
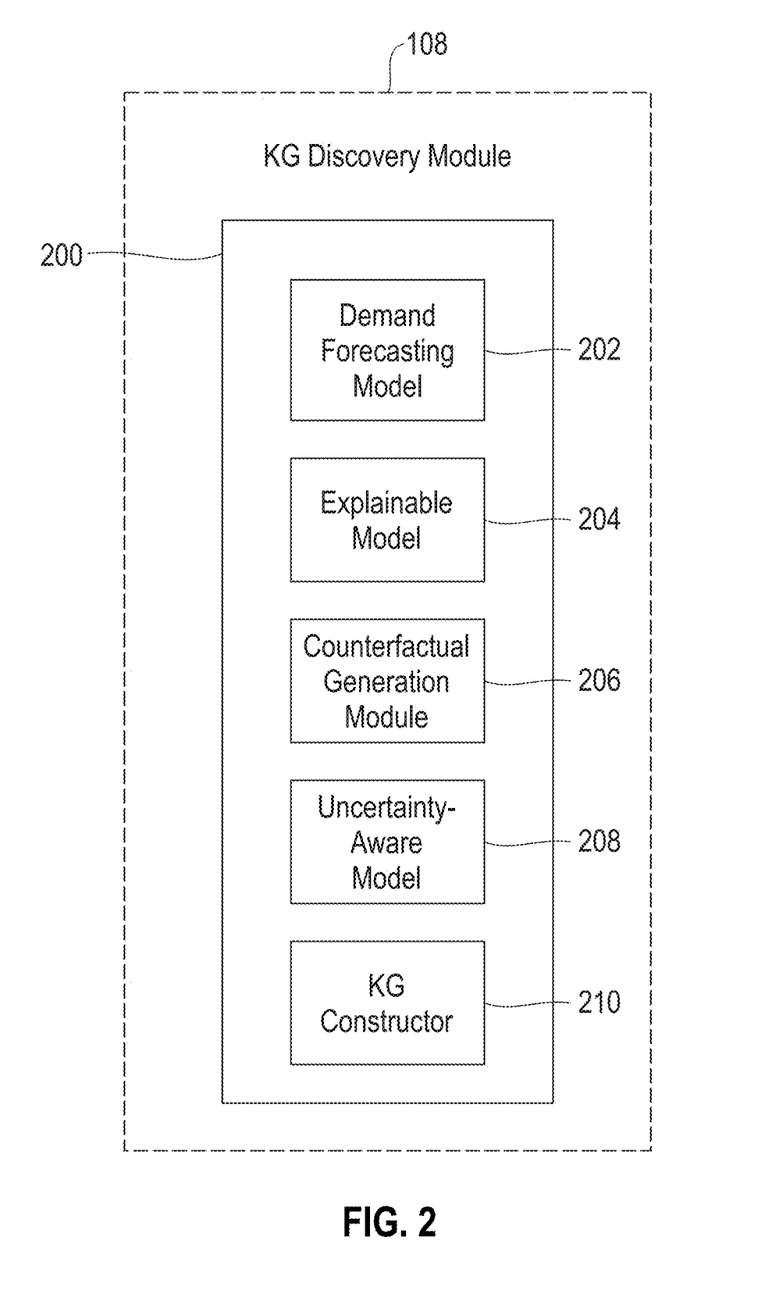
FIG. 2 is a diagram illustrating an example of a reasoning layer, according to an exemplary embodiment of the present disclosure.

Referring to FIG. 2, this figure shows an example of a reasoning layer 200 in accordance with exemplary embodiments. The reasoning layer 200 may be implemented at least in part by the KG discovery module 108 of FIG. 1. Generally, the reasoning layer 200 enables interaction between a coherent group of AI modules such as a prediction model, an explainable model, a counterfactual engine, and an uncertainty-aware AI model to analyze and explain the impact of risks, such as risks associated with mid-term to long-term climate variability and/or extreme events, for example. The reasoning layer 200 may identify important features that have a high impact on a given prediction or classification task using an explainable model, such as a Shapley Additive Explanations (SHAP) model, for example.

In the FIG. 2 embodiment, the reasoning layer 200 obtains a demand forecasting model 202 for predicting a demand forecast for a given product, and performs an impact analysis using an explainable model 204 to identify important features. For example, the important features may be identified by determining the negative and/or positive impact of various parameters, such as climate variations and disruptive events parameters, on the demand forecasting model 202.

The reasoning layer 200 also includes a counterfactual generation module 206 that automatically generates a set of what-if queries (also referred to herein as counterfactual queries) based on the impact analysis. An uncertainty-aware model 208 generates uncertainty scores for the climate variation and disruptive event parameters. The uncertainty-aware model 208 may interact with the counterfactual generation module 206 to generate the set of what-if queries by perturbing a spatiotemporal query (for example, query 110) based on such parameters and corresponding uncertainty scores and by minimizing or maximizing a cost function using a genetic algorithm to maximize or minimize demand for the product, for example.

The reasoning layer includes a KG constructor 210 that prunes the set of what-if queries based on one or more criteria, such as, for example, disregarding particular input parameter combinations based on a set of constraints (e.g., domain-specific constraints, region-specific constraints, etc.) or disregarding input parameter combinations for which the demand forecasting model 202 is uncertain about (e.g., when the uncertainty score satisfies an uncertainty threshold).

The KG constructor 210 creates a reasoning KG (e.g., corresponding to KG 112) by exhaustively generating all possible nodes based on the set of what-if queries over the entire range of the parameters, and consolidating and/or filtering the nodes in a such a way that the demand prediction is different between nodes in at least one aspect (e.g., higher/lower demand, higher/lower model confidence, etc.). In some examples, the KG constructor 210 may also discover AND/OR properties of each node based on the spatiotemporal user query. For example, if the spatiotemporal query identifies an AND relationship between two climatic parameters (e.g., temperature and rainfall), then the KG constructor 210 can incorporate such information into the reasoning KG. As such, the reasoning KG captures various scenarios along with uncertainty predictions. The KG is in a form that is utilized by a user interface so that a user can analyze and understand the mid-term/long-term risk of such scenarios at various stages in the supply chain, possibly enable intervention.

Figure 3:
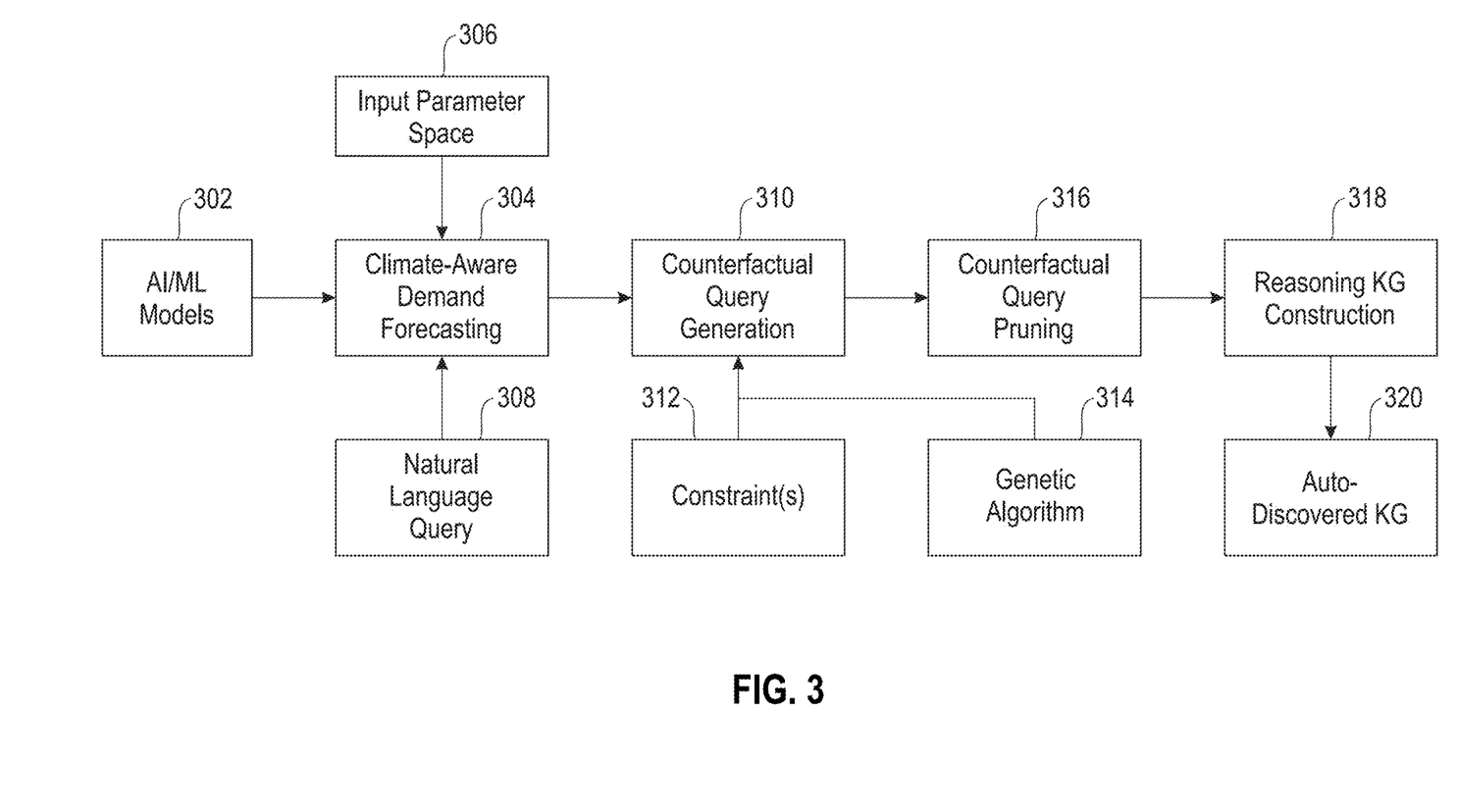
FIG. 3 is a flow diagram for reasoning KG modeling, according to an exemplary embodiment of the present disclosure.

FIG. 3 is a flow diagram for reasoning KG modeling, according to an exemplary embodiment of the present disclosure. In the FIG. 3 embodiment, climate aware demand forecasting 304 is performed based on a natural language query (e.g., an encoded natural language query from a user), one or more AI/ML (machine learning) models 302, and an input parameter space 306. The input parameter space 306 may include various climatic parameters, such as, for example, historical parameters related to humidity, temperature, weather events (e.g., flood, hurricane, etc.). Counterfactual query generation 310 is based on the output of the climate-aware demand forecasting 304, constraints(s) 312, and a genetic algorithm 314. The constraint(s) 312 may include one or more of, for example, constraints to maximize or minimize demand, constraints related to uncertainty modeling, and domain and/or region specific constraints. Generally, the genetic algorithm 314 relates to a search-based optimization technique that generates a set of counterfactual queries to find optimal (or near-optimal) solutions using selection, crossover, and mutation operations in an iterative manner. The objective of the genetic algorithm is to traverse the search space by generating counterfactual queries. The counterfactual queries are then consolidated by performing one or more clustering techniques on a counterfactual query space to construct a KG such that it helps in explaining the impact associated with minimizing or maximizing a cost function. Counterfactual query pruning 316 is then applied to the counterfactual queries based on, for example, the one or more constraint(s) 312, as described in more detail elsewhere herein. Reasoning KG construction 318 is performed based at least in part on the resulting set of counterfactual queries, to generate the auto-discovered KG 320.

By way of example, the reasoning KG construction 318 may include building the auto-discovered KG 318 on top of the counterfactual (e.g., what-if queries) to make the KG easier to consume for a user (e.g., a supply chain planner). According to at least one embodiment, constructing a KG includes, for example, exhaustively generating all possible nodes on the KG based on the what-if queries over the entire range of the climatic forecasts (temperature/rainfall); consolidating and/or filtering these nodes in a such a way that demand prediction is different between nodes in at least some aspects (e.g., higher/lower demand, high/low model confidence, etc.); and discovering AND/OR properties of the nodes based on the input user query (e.g., temperature AND rainfall).

According to at least one embodiment, a system (e.g., system 102) analyzes natural language user queries of a user to determine risks within a given supply chain. For example, such a query may be analyzed by parsing the query using one or more natural language processing techniques and, optionally, based on a profile associated with the user. The user profile may be used to accurately determine the intents and the spatiotemporal supply chain natural language queries. For example, the user profile may provide additional information that can be used to capture the contextual information related to, for example, the domain, location, product details which can be mined from historical user queries.

In at least one example embodiment, a sentence embedding function is applied to the parsed query (e.g., Sent2Vec using Bidirectional Encoder Representations from Transformers (BERT) model), which is then used as input to an intent classification model and a supply chain stage classification model to determine a particular stage of a supply chain associated with the query. In some examples, if a confidence value associated with the determined supply chain stage classification is below a threshold value, then the system automatically initiates an interactive conversation with the user to clarify attributes in the query to improve the confidence of the classification. The interactive conversation may generate questions to obtain more information about, for example, a product category or region associated with query. When the confidence value exceeds the threshold, then the system identifies a subset of domain ontologies (e.g., specified by an SME) relevant to the user query, and a set of entities associated with the identified subset of the domain ontologies.

Figure 4:
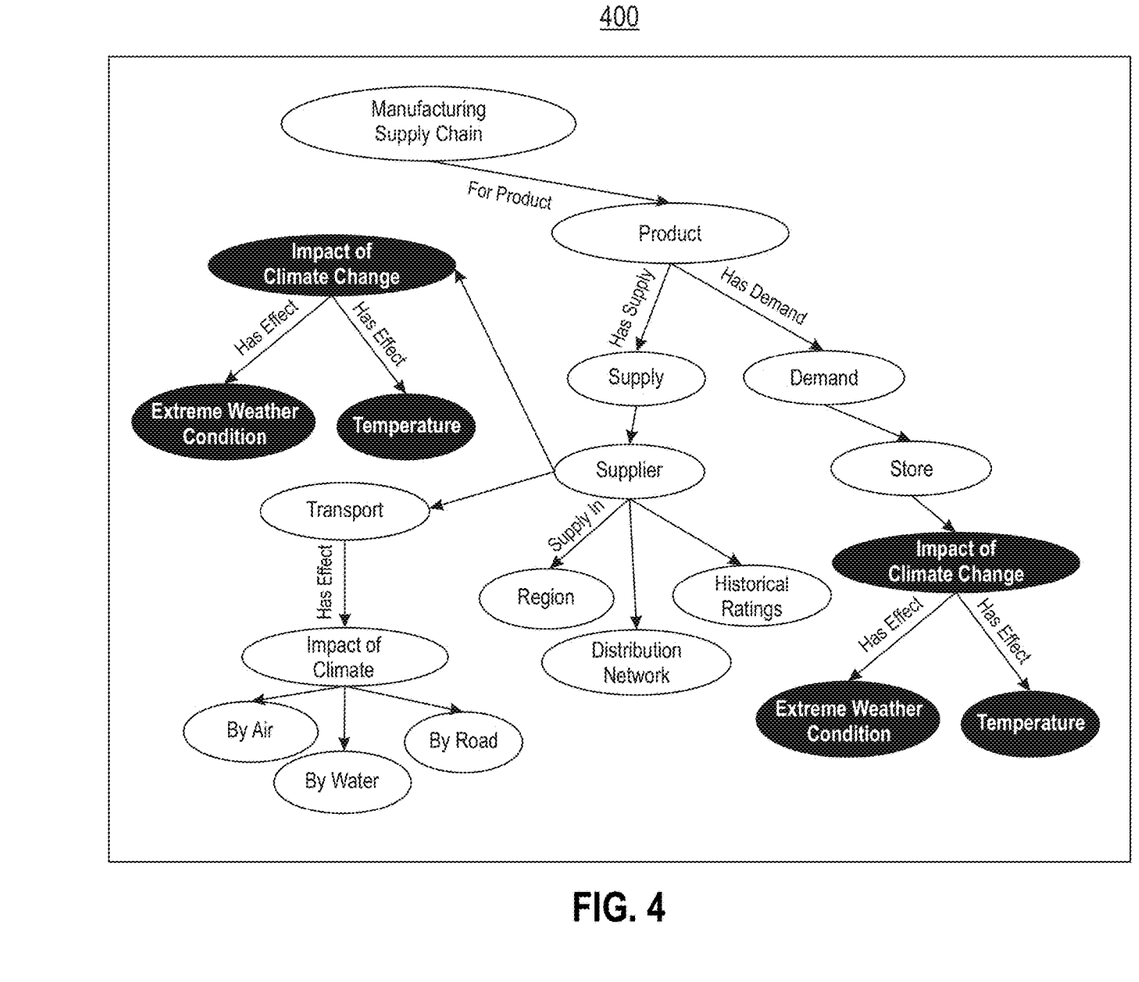
FIG. 4 is a diagram illustrating an example of a domain ontology, according to an exemplary embodiment of the present disclosure.

Referring now to FIG. 4, this figure shows an example of a domain ontology 400 in accordance with exemplary embodiments. The domain ontology 400 may be used to identify relevant entities within different stages of a supply chain for a given product. By way of example, the supply chain may correspond to a manufacturing supply chain that includes a material supplier stage, a manufacturer stage, a logistics stage, a distribution center stage, and a retail stage. In at least one embodiment, the domain ontology 400 may be defined by an SME. For example, assume the product in the domain ontology 400 corresponds to a winter jacket and the following natural language text query (e.g., corresponding to query 110) is provided: "What will be the impact on demand forecasting for winter jackets if there is an average temperature reduction by 5° C. in Delhi, India next winter season?" In this example, the domain ontology 400 may be used to identify the supply chain stage related to the query and the relevant entities associated with that supply chain stage.

In some examples, a reasoning KG is automatically discovered by analyzing counterfactual queries created based in part on, for example, the entities identified from one or more domain ontologies (e.g., domain ontology 400). As such, the constructed KG may capture relationships between such identities, wherein the relationships can be represented as edges in the KG. As an example, the KG may capture different climatic conditions in the form of entity nodes. Non-limiting examples of such entity nodes include: "average temperature reduction by 5° C. in the month of September"; "average rainfall increase by 50 mm in the month of June"; "average wind speed increase by 40 km in the month of February"; "climatic impact on demand when average temperature will be within 5° C. and 9° C."; climatic impact on demand when average rainfall will be within 50 mm and 70 mm." Also, relationships between such entity nodes may correspond to one or more of: a prediction within a specified uncertainty range (e.g., temperature, humidity, rainfall); a prediction with high confidence; a prediction with modified climatic variations; a prediction with increased demand; a prediction with decreased demand; a prediction with decreased demand; a prediction without disruptive events; a prediction with disruptive events; a prediction with climatic variation and disruptive events. In at least some embodiments, a reasoning KG may be constructed in such a way so as to captures nodes with multiple attributes in the context of AND/OR operations, such as, for example, "average temperature reduction by 5° C. and total rainfall increase by 20 mm in the month of September" or "average temperature reduction by 5° C. or total rainfall increase by 20 mm in the month of September."

Figure 5:
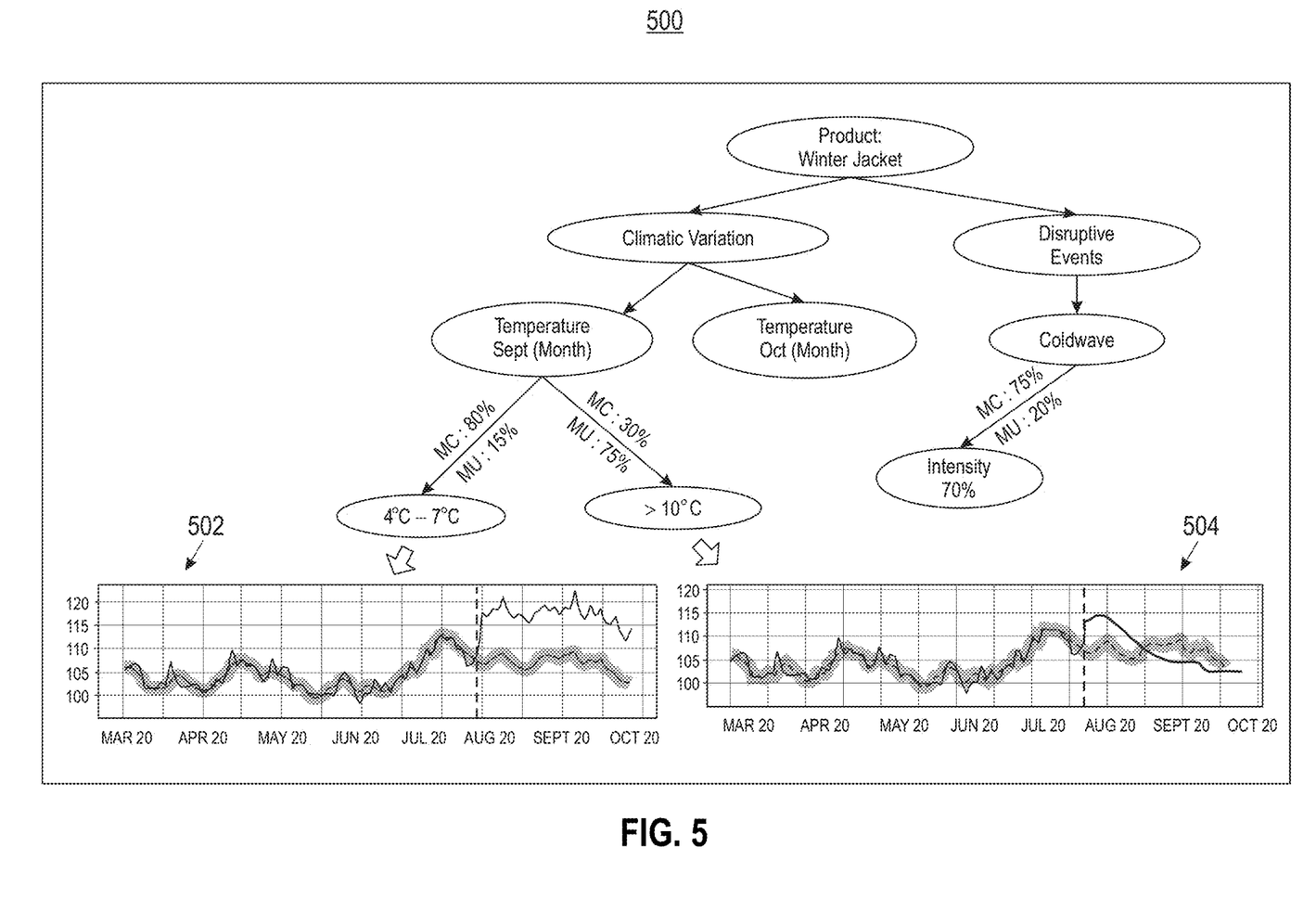
FIG. 5 is a diagram illustrating an example of a KG, according to an exemplary embodiment of the present disclosure.

Referring also to FIG. 5, this figure shows an example of a KG 500 according to an exemplary embodiment. In the FIG. 5 example, the KG 500 is created for the winter coat query described above in conjunction with FIG. 4. As such, the KG 500 is relevant to the retail stage of a supply chain for winter coats for the winter months. The KG 500 indicates the model confidence (MC) and module uncertainty (MU) values for the predicted temperature ranges for the node corresponding to the temperatures for the month of September (i.e., the "Temp September (Month)" node). Although not shown in FIG. 5, it is to be appreciated that the KG 500 may include additional nodes corresponding to the October temperature node. The KG 500 also includes predicted demand forecasts 502, 504 for the respective temperate range nodes.

Accordingly, one or more embodiments may process the natural language query to identify a product category (e.g., winter jackets), a region (e.g., Delhi, India), a corresponding time-frame (e.g., a season, month, weeks, etc.) and a supply chain stage (e.g., retail stage) associated with the query. Climate and/or disruptive event models may generate predictions relevant to the identified time-frame and region. For example, a prediction may indicate the temperature in the region will be 5° C. lower in temperature than the previous winter for the identified time-frame and region. Given this prediction, a climate-aware demand forecast model generates a prediction that demand for the product will increase by a particular amount, and, optionally, a confidence score may be assigned to the prediction. Additionally, an explainable climate-aware demand forecast is generated by automatically discovering and traversing different branches of a reasoning r based on the climate-aware demand forecast. As such, users can assess demand variability in response to different climatic temperature predictions.

Figure 6:
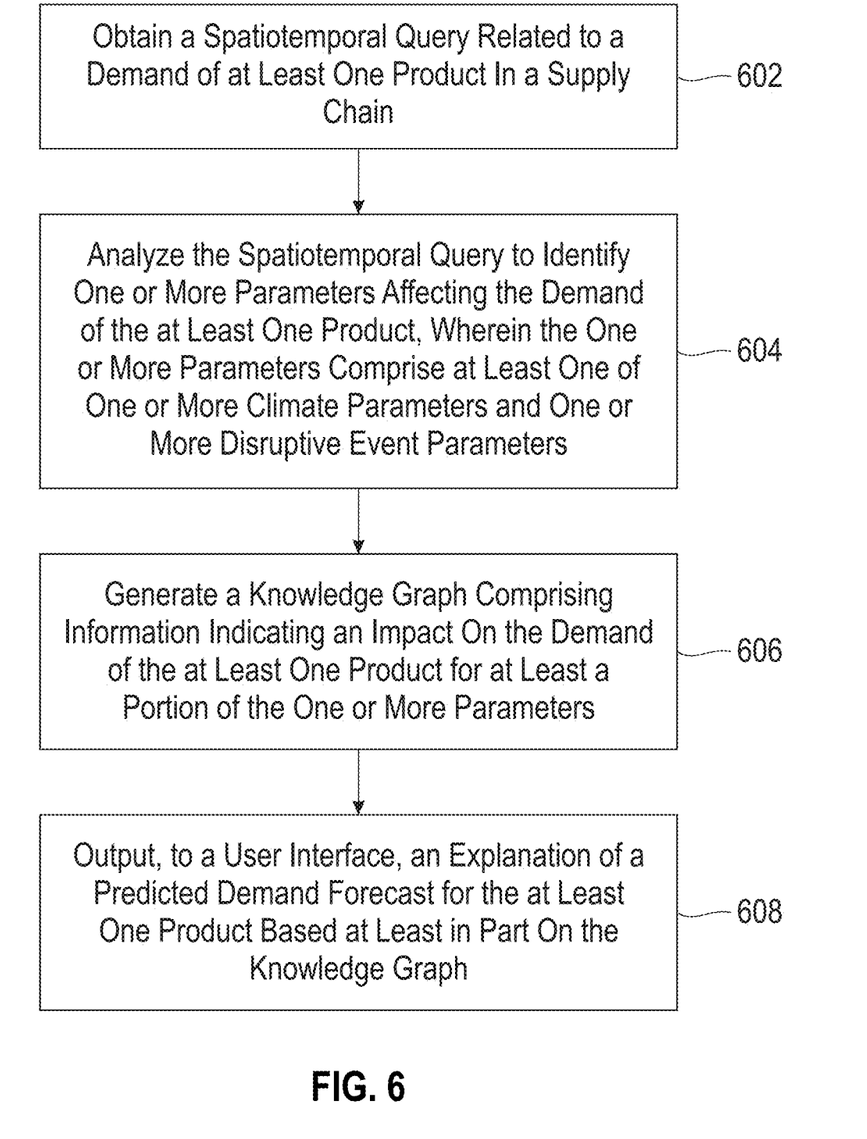
FIG. 6 is a flow diagram illustrating techniques for auto-discovery of reasoning knowledge graphs according to an embodiment of the present disclosure.

FIG. 6 is a flow diagram illustrating techniques according to an embodiment of the present disclosure. Step 602 includes obtaining a spatiotemporal query related to a demand of at least one product in a supply chain. Step 604 includes analyzing the spatiotemporal query to identify one or more parameters affecting the demand of the at least one product, wherein the one or more parameters comprise at least one of one or more climate parameters and one or more disruptive event parameters. Step 606 includes generating a knowledge graph comprising information indicating an impact on the demand of the at least one product for at least a portion of the one or more parameters. Step 608 includes outputting, to a user interface, an explanation of a predicted demand forecast for the at least one product based at least in part on the knowledge graph. The analyzing may include identifying one or more entities and one or more domain ontologies for at least one particular stage in the supply chain that is related to the spatiotemporal query. The techniques in FIG. 6 may include obtaining a prediction model that is trained to predict the demand forecast of the at least one product; and determining the impact of each of the one or more parameters on the predicted demand forecast based at least in part on an explainable model. The generating may include generating one or more sets of what-if queries for the one or more parameters, wherein each what-if query in the set corresponds to a different value or different range of values for a given one of the parameters; and filtering the one or more sets of what-if queries based on at least one of: one or more geographical constraints related to the spatiotemporal query and one or more domain-specific constraints related to the spatiotemporal query. The knowledge graph may include entity nodes capturing different scenarios corresponding to at least a portion of the one or more parameters; and edges indicating relationships between pairs of the entity nodes, wherein the relationships correspond to at least one of: a predicted change in demand, a model confidence score, and a model uncertainty score. The spatiotemporal query may include a natural language text query, and wherein said analyzing comprises applying one or more natural language processing techniques to identify a context of the spatiotemporal query, the context comprising at least one of: one or more characteristics of the at least one product, a region related to the spatiotemporal query, a particular stage within the supply chain related to the spatiotemporal query. The one or more climate parameters may correspond to at least one of temperature and rainfall. The one or more disruptive event parameters may correspond to at least one of: a manmade disaster, a natural disaster, and an environmental disaster.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 7:
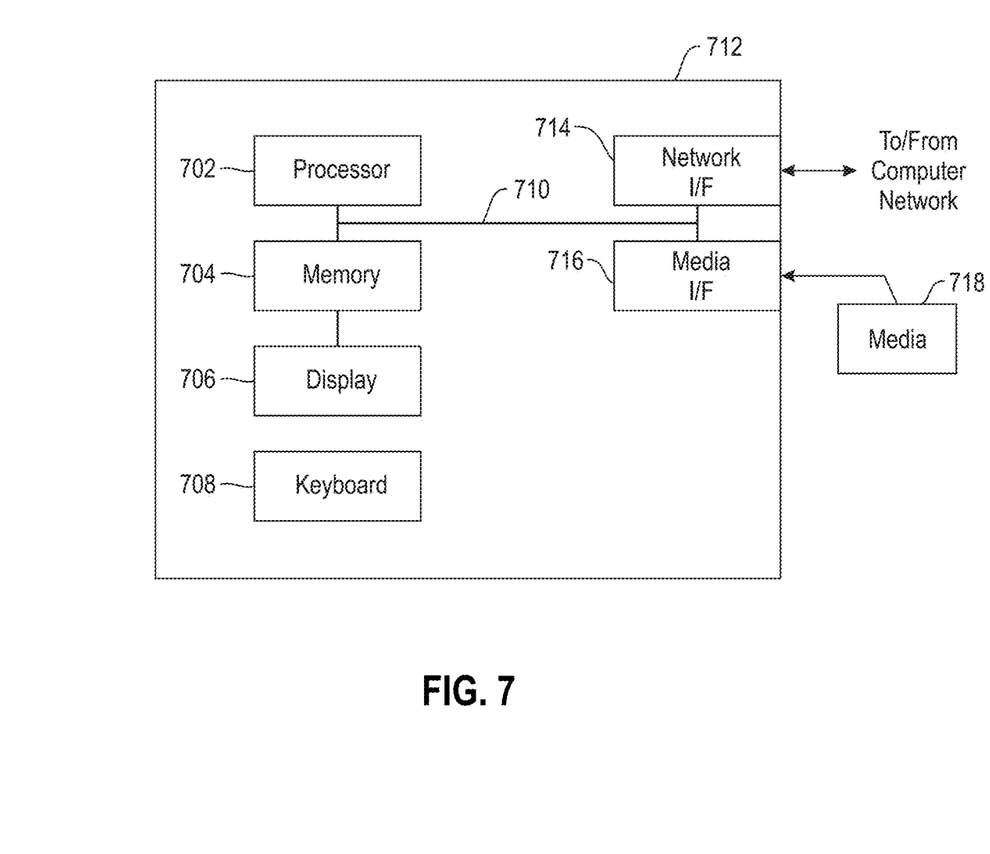
FIG. 7 is a system diagram of an exemplary computer system on which at least one embodiment of the present disclosure can be implemented.

Additionally, an embodiment of the present invention can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

The present invention may be a system, a method, and/or a computer program product at any possible technical detail level of integration. The computer program product may include a computer readable storage medium (or media)

having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702.

Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
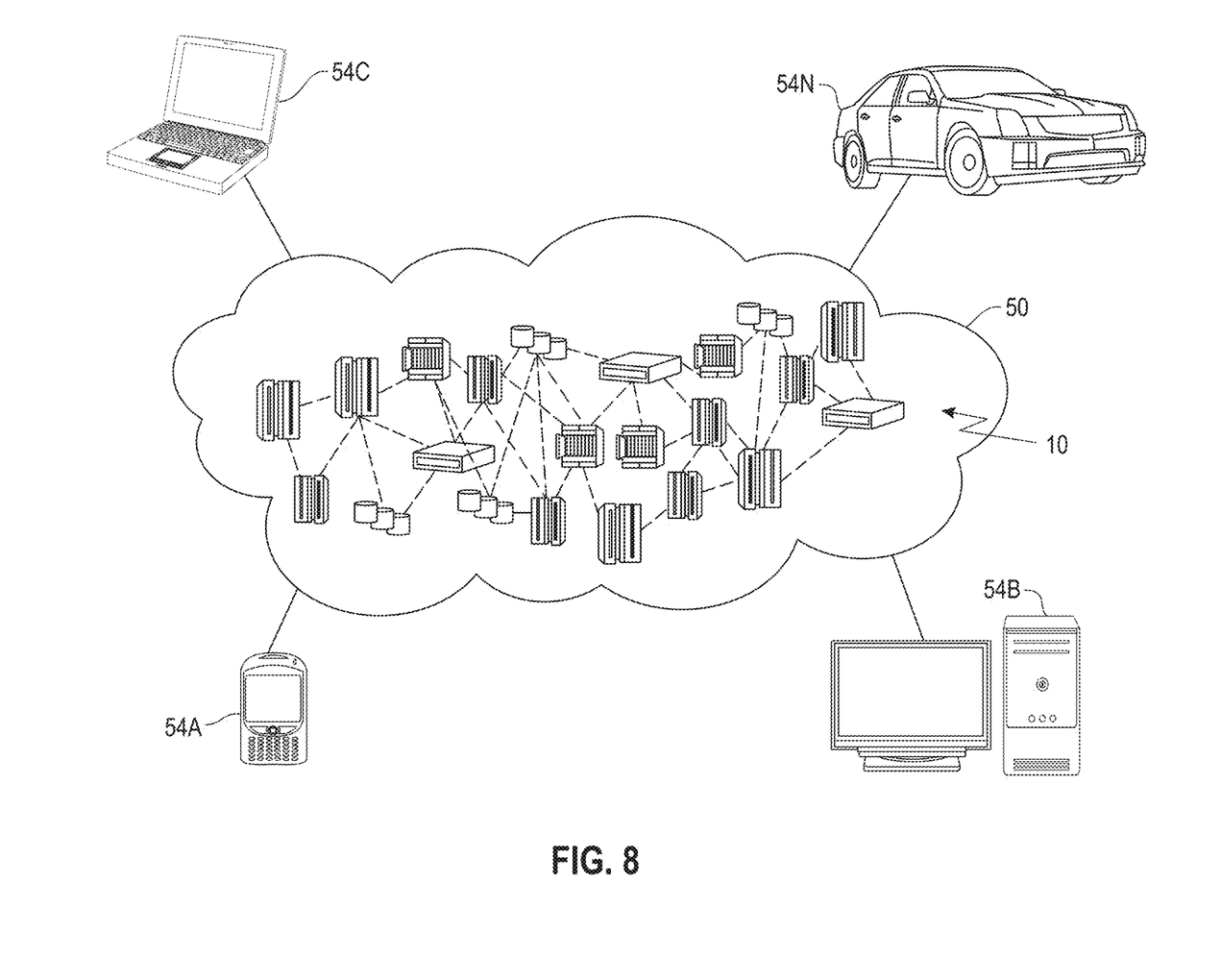
FIG. 8 depicts a cloud computing environment according to an embodiment of the present disclosure.

Referring now to FIG. 8, illustrative cloud computing environment 50 is depicted. As shown, cloud computing environment 50 includes one or more cloud computing nodes 10 with which local computing devices used by cloud consumers, such as, e.g., personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
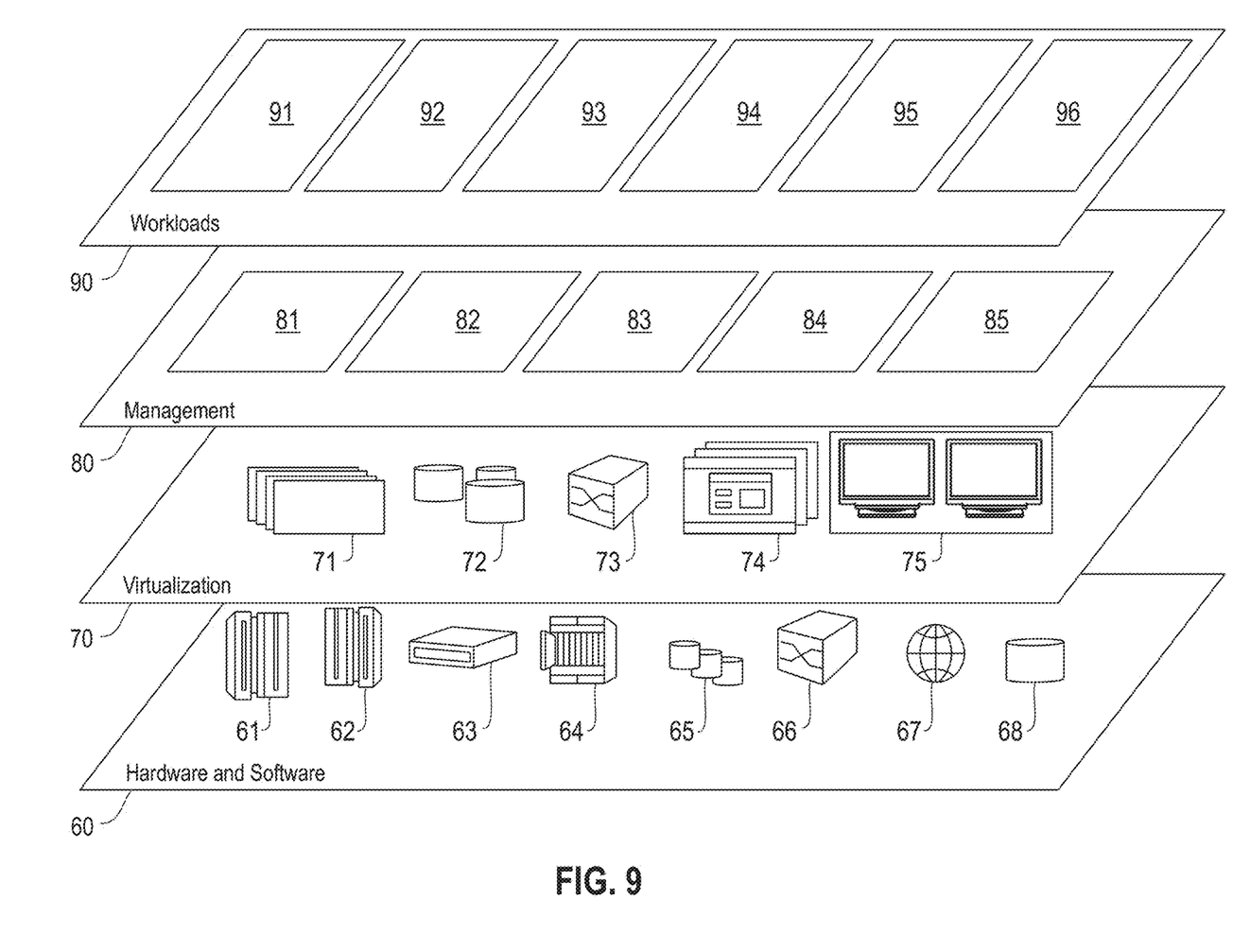
FIG. 9 depicts abstraction model layers according to an embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and auto-discovering KGs 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide one or more beneficial effects such as, for example, enabling a user to specify natural language queries to determine risk associated in the supply chains, automatically discovering reasoning KG based on a user's spatiotemporal query, and an automated way of understanding disruption at each stage of a supply chain to enable explainable decision-making.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
obtaining a natural language spatiotemporal query related to a demand of at least one product in a supply chain;
applying one or more natural language processes to the natural language spatiotemporal query to identify a context of the natural language spatiotemporal query;
determining, based at least in part on the context, one or more parameters affecting the demand of the at least one product, wherein the one or more parameters comprise at least one of one or more climate parameters and one or more disruptive event parameters;
generating a set of counterfactual queries by perturbing the natural language spatiotemporal query with respect to at least one of the one or more parameters, wherein the generating comprises traversing a search space corresponding to the one or more parameters using an iterative search-based optimization algorithm;
computing one or more confidence values for one or more corresponding demand forecasts generated by a prediction model for the set of counterfactual queries;
constructing a knowledge graph comprising a set of nodes for at least a portion of the set of counterfactual queries, wherein each node in the set comprises information indicating an impact on the demand of the at least one product for at least a portion of the one or more parameters, and wherein the constructing comprises pruning one or more nodes in the set in response to determining that at least a first one of the computed confidence values satisfies a confidence value threshold corresponding to the computed first confidence value;
determining that at least a second one of the computed confidence values does not satisfy a confidence value threshold corresponding to the at least one computed second confidence value;
in response to determining that the at least second one of the computed confidence values does not satisfy the confidence value threshold corresponding to the at least one computed second confidence value, automatically initiating an interactive conversation with the user, wherein the interactive conversation comprises:
generating and outputting at least one question to the user, wherein the at least one question is generated based at least in part on the context; and
updating the at least one second computed confidence value based on feedback received from the user for the at least one question; and
outputting, to a user interface, an explanation of a predicted demand forecast for the at least one product based at least in part on the knowledge graph;

wherein the method is carried out by at least one computing device.

2. The computer-implemented method of claim 1, wherein said determining comprises:
identifying one or more entities and one or more domain ontologies for at least one particular stage in the supply chain that is related to the natural language spatiotemporal query.

3. The computer-implemented method of claim 1, comprising:
determining, using an explainable model, the impact of each of the one or more parameters on the demand forecasts generated by the prediction model.

4. The computer-implemented method of claim 1, wherein:
each counterfactual query in the set corresponds to a different value or different range of values for a given one of the parameters; and
the generating the set of counterfactual queries comprises filtering the set of counterfactual queries based on at least one of: one or more geographical constraints related to the natural language spatiotemporal query and one or more domain-specific constraints related to the natural language spatiotemporal query.

5. The method of claim 4, wherein:
the set of nodes comprises entity nodes capturing different scenarios corresponding to at least a portion of the one or more parameters; and
the knowledge graph comprises edges indicating relationships between pairs of the entity nodes, wherein the relationships correspond to at least one of: a predicted change in demand, a model confidence score, and a model uncertainty score.

6. The computer-implemented method of claim 1, wherein the context comprises at least one of: one or more characteristics of the at least one product, a region related to the natural language spatiotemporal query, a particular stage within the supply chain related to the natural language spatiotemporal query.

7. The computer-implemented method of claim 1, wherein the one or more climate parameters correspond to at least one of temperature and rainfall.

8. The computer-implemented method of claim 1, wherein the one or more disruptive event parameters correspond to at least one of: a manmade disaster, a natural disaster, and an environmental disaster.

9. The computer-implemented method of claim 1, comprising:
causing, based on the explanation, initiation of at least one proactive action to at least minimize the impact on the demand of the at least one product for at least a portion of the one or more parameters.

10. The computer-implemented method of claim 2, wherein identifying the one or more entities and the one or more domain ontologies for the at least one particular stage in the supply chain comprises:
generate at least one vector representation for the natural language spatiotemporal query using at least one transformer-based machine learning model; and
processing the generated at least one vector representation with at least one classification model that is configured to determine the at least one particular stage of the supply chain associated with the natural language spatiotemporal query.

11. A computer program product comprising a computer readable storage medium having program instructions embodied therewith, the program instructions executable by a computing device to cause the computing device to:
obtain a natural language spatiotemporal query related to a demand of at least one product in a supply chain;
apply one or more natural language processes to the natural language spatiotemporal query to identify a context of the natural language spatiotemporal query;
determine, based at least in part on the context, one or more parameters affecting the demand of the at least one product, wherein the one or more parameters comprise at least one of one or more climate parameters and one or more disruptive event parameters;
generate a set of counterfactual queries by perturbing the natural language spatiotemporal query with respect to at least one of the one or more parameters, wherein the generating comprises traversing a search space corresponding to the one or more parameters using an iterative search-based optimization algorithm;
compute one or more confidence values for one or more corresponding demand forecasts generated by a prediction model for the set of counterfactual queries;
construct a knowledge graph comprising a set of nodes for at least a portion of the set of counterfactual queries, wherein each node in the set comprises information indicating an impact on the demand of the at least one product for at least a portion of the one or more parameters, and wherein the constructing comprises pruning one or more nodes in the set in response to determining that a given computed confidence value satisfies a corresponding confidence threshold;
in response to determining that at least one of the computed confidence values does not satisfy the corresponding confidence value threshold, automatically initiate an interactive conversation with the user, wherein the interactive conversation comprises:
generate and output at least one question to the user, wherein the at least one question is generated based at least in part on the context; and
update the at least one computed confidence value based on feedback received from the user for the at least one question; and
output, to a user interface, an explanation of a predicted demand forecast for the at least one product based at least in part on the knowledge graph.

12. The computer program product of claim 11, wherein said determining comprises:
identifying one or more entities and one or more domain ontologies for at least one particular stage in the supply chain that is related to the natural language spatiotemporal query.

13. The computer program product of claim 11, wherein the program instructions executable by the computing device further cause the computing device to:
determine, using an explainable model, the impact of each of the one or more parameters on the demand forecasts generated by the prediction model.

14. The computer program product of claim 11, wherein:
each counterfactual query in the set corresponds to a different value or different range of values for a given one of the parameters; and
the generating the set of counterfactual queries comprises filtering the set of counterfactual queries based on at least one of: one or more geographical constraints related to the natural language spatiotemporal query and one or more domain-specific constraints related to the natural language spatiotemporal query.

15. The computer program product of claim 14, wherein:
the set of nodes comprises entity nodes capturing different scenarios corresponding to at least a portion of the one or more parameters; and
the knowledge graph comprises edges indicating relationships between pairs of the entity nodes, wherein the relationships correspond to at least one of: a predicted change in demand, a model confidence score, and a model uncertainty score.

16. The computer program product of claim 11, wherein the context comprises at least one of: one or more characteristics of the at least one product, a region related to the natural language spatiotemporal query, a particular stage within the supply chain related to the natural language spatiotemporal query.

17. The computer program product of claim 11, wherein at least one of:
the one or more climate parameters correspond to at least one of temperature and rainfall; and
the one or more disruptive event parameters correspond to at least one of: a manmade disaster, a natural disaster, and an environmental disaster.

18. A system comprising:
a memory configured to store program instructions;
a processor operatively coupled to the memory to execute the program instructions to:
obtain a natural language spatiotemporal query related to a demand of at least one product in a supply chain;
obtain a natural language spatiotemporal query related to a demand of at least one product in a supply chain;
apply one or more natural language processes to the natural language spatiotemporal query to identify a context of the natural language spatiotemporal query;
determine, based at least in part on the context, one or more parameters affecting the demand of the at least one product, wherein the one or more parameters comprise at least one of one or more climate parameters and one or more disruptive event parameters;
generate a set of counterfactual queries by perturbing the natural language spatiotemporal query with respect to at least one of the one or more parameters, wherein the generating comprises traversing a search space corresponding to the one or more parameters using an iterative search-based optimization algorithm;
compute one or more confidence values for one or more corresponding demand forecasts generated by a prediction model for the set of counterfactual queries;
construct a knowledge graph comprising a set of nodes for at least a portion of the set of counterfactual queries, wherein each node in the set comprises information indicating an impact on the demand of the at least one product for at least a portion of the one or more parameters, and wherein the constructing comprises pruning one or more nodes in the set in response to determining that a given computed confidence value satisfies a corresponding confidence threshold;
in response to determining that at least one of the computed confidence values does not satisfy the corresponding confidence value threshold, automatically initiate an interactive conversation with the user, wherein the interactive conversation comprises:
generate and output at least one question to the user, wherein the at least one question is generated based at least in part on the context; and
update the at least one computed confidence value based on feedback received from the user for the at least one question; and
output, to a user interface, an explanation of a predicted demand forecast for the at least one product based at least in part on the knowledge graph.

19. The system of claim 18, wherein said determining comprises:
identifying one or more entities and one or more domain ontologies for at least one particular stage in the supply chain that is related to the natural language spatiotemporal query.

20. The system of claim 18, wherein the processor is operatively coupled to the memory to execute the program instructions to:
determine, using an explainable model, the impact of each of the one or more parameters on the demand forecasts generated by the prediction model.

* * * * *